United States Patent [19]

Parulski et al.

[11] Patent Number: 4,967,264
[45] Date of Patent: Oct. 30, 1990

[54] COLOR SEQUENTIAL OPTICAL OFFSET IMAGE SAMPLING SYSTEM

[75] Inventors: Kenneth A. Parulski, Rochester; Thomas C. Nutting, Fairport; Leslie G. Moore, Webster, all of N.Y.

[73] Assignee: Eastman Kodak Company, Rochester, N.Y.

[21] Appl. No.: 343,766

[22] Filed: May 30, 1989

[51] Int. Cl.$^5$ .............................................. H04N 9/07
[52] U.S. Cl. ....................................... 358/44; 358/42; 358/75
[58] Field of Search ....................... 358/75, 41, 42, 44, 358/43

[56] References Cited

U.S. PATENT DOCUMENTS

| | | | |
|---|---|---|---|
| 4,318,123 | 3/1982 | Knop | 358/43 |
| 4,663,661 | 5/1987 | Weldy et al. | 358/44 |
| 4,786,964 | 11/1988 | Plummer et al. | 358/44 |
| 4,851,899 | 7/1989 | Yoshida et al. | 358/75 |

Primary Examiner—James J. Groody
Assistant Examiner—Kim Yen Vu
Attorney, Agent, or Firm—Edward Dugas

[57] ABSTRACT

The system of the present invention increases the resolution (number of picture elements or pixels) of an image that may be formed from an image sensor without increasing the resolution of the sensor. The system operates upon a color image beam using a set of primary color filters, including at least two filters of the same color, with at least one of the filters being capable of displacing the color image beam by a distance equal to a fraction of the distance between adjacent photosensitive elements which form the image sensor. The color wheel is rotated to sequentially place each filter of the set of primary filters into the color image beam. The array of photosensitive elements forming the image sensor is positioned to receive the colored image beam which passes through each filter. Each photosensitive element produces signals indicative of the intensity of the color image beam components incident thereon. The signals produced by the photosensitive elements of the image sensor are stored for each filter positioned in the path of the color image beam. A composite image signal is formed from the stored signals by combining the signals such that the filter displaced pixels are interleaved with the non-displaced pixels. The resultant image therefore has a greater number of pixels, or higher resolution, than the image sensor.

11 Claims, 6 Drawing Sheets

GREEN PIXELS

RED AND BLUE "EFFECTIVE" PIXELS

SUM OF 2 GREEN PIXELS

WHEEL ROTATES AFTER EACH IMAGE TRANSFER

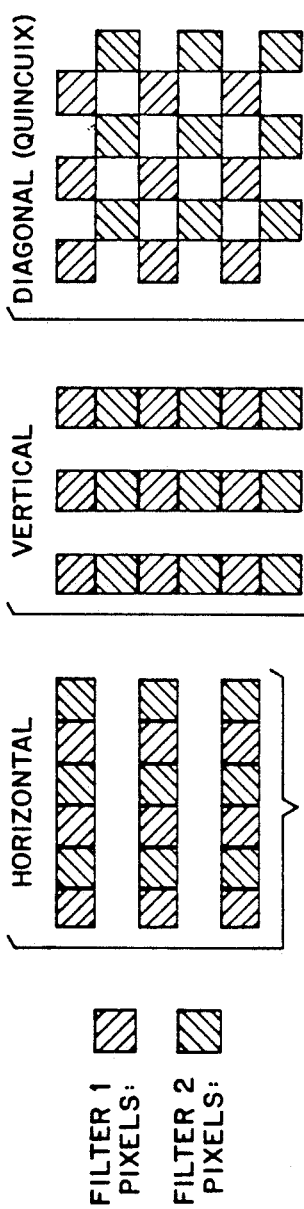
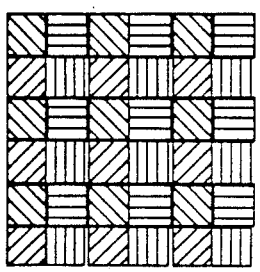

COLOR SEQUENTIAL OPTICAL OFFSET IMAGE SAMPLING SYSTEM

TECHNICAL FIELD OF THE INVENTION

The present invention relates to optical systems for transforming a fixed image to an electrically storable image and more particularly to an optical sampling system with increased resolution.

BACKGROUND OF THE INVENTION

An image sensor is formed of sensing elements which are referred to as picture elements or "pixels". The resolution of an image sensor is a direct function of how many pixels there are in a matrix of rows and columns. A sensor having, for example, 500 horizontal pixels per row will have a lower resolution than one which has 1,000 horizontal pixels per row.

In the present invention the output images from a system incorporating a monochrome sensor and a color filter wheel are increased in resolution without an increase in the resolution of the image sensor. The present invention sequentially scans an image such as a film image and combines the signals resulting from the scanning to increase the resolution of an output image.

U.S. Pat. No. 4,638,371, "Multiple Exposure of Area Image Sensor Having a Sparse Array of Elements" by James R. Milch, assigned to Eastman Kodak Company, the assignee of the present invention, teaches a method for obtaining a high resolution image sensor by combining multiple scanned images which are optically offset by angled glass plates. Precisely controlled servo motors are needed to properly position the glass plates.

A single image sensor can be used to provide red, green and blue color separation images from a film image by sequentially placing a series of color filters between the film and sensor. A patent which teaches this technique is U.S. Pat. No. 2,435,962 entitled "Color Television" by P.C. Goldmark et al wherein a rotatable color wheel having repeating transparent red, green and blue segments is provided. Additionally, segments of two different thicknesses are used. A light beam intersects one segment at a time as the wheel is rotated and is displaced by a distance that is a function of the thickness of the segment, which is set to provide a vertical offset corresponding to one scan line. This method does not increase the resolution of the output image, but instead eliminates color crosstalk when used in an interlaced field sequential color television system.

Another patent of interest for its teachings in this area is U.S. Pat. No. 4,786,964 entitled "Electronic Color Imaging Apparatus with Prismatic Color Filter Periodically Interposed in Front of an Array of Primary Color Filters" by W. T. Plummer et al. The apparatus of that patent uses a color wheel having four openings. Within two opposing openings a prismatic magenta filter is positioned to remove the green component of the image and to shift the remaining components of the image by a fixed amount. A subtractive tricolor filter is positioned between an array of CCD light detecting elements to receive the shifted and non shifted image components.

The electrical signals representing the shifted and the non shifted images may be stored and later recombined by counter shifting the shifted image from the magenta filter and combining the two images. The aforementioned apparatus solves the problem of a dominant green color component being detected by the CCD array which arises because the subtractive tricolor filter allows the green component of an image to be received by all of the CCD sensing elements whereas the red and blue components will each be received by only one third of the total number of CCD sensing elements. Shifting the image with the magenta filter removes the green dominance problem, but does not increase the resolution of the image beyond the resolution of the sensor.

SUMMARY OF THE INVENTION

The apparatus of the present invention increases the resolution of a color image by combining a color filtered and displaced image with a color filtered and non displaced image to place pixels of the displaced and non displaced images into interleaved positions.

The apparatus includes a color filter wheel which is rotatably mounted perpendicular to a color image beam and an image sensor formed from an array of photosensitive elements for generating signals indicative of the component of the color image beam incident thereon.

A plurality of color filters are mounted in openings through the color filter wheel to displace the light passing through the filter, such that the image passing through the angled filter is displaced by a fraction of the distance between adjacent photosensitive elements forming the sensor, to optically offset the image provided to the image sensor. The image sensor sequentially receives the light passed by all of the filters and converts the image formed by the light to corresponding electrical signals. The electrical signals from each image are stored and/or recombined by interleaving, to form an image with increased resolution.

Therefore, it is a primary object of the present invention to provide an improved optical offset image sampling system.

It is another object of the present invention to increase the resolution of an image by capturing more pixels of light using optical offset sampling.

It is a further object of the present invention to provide optical offset sampling using a simple mechanism which does not require precisely controlled servo motors.

These and other objects of the present invention will become more apparent when taken in conjunction with the following description and drawings wherein like characters indicate like parts and which drawings form a part of the present application.

BRIEF DESCRIPTION OF THE DRAWINGS

FIGS. 8A and 8B illustrate cross-hatching for identifying two types of square pixels.

FIGS. 9A through 9C illustrate pixel patterns incorporating the square pixels shown in FIG. 8A and 8B which pattern are achievable with the present system embodiments.

FIGS. 10A and 10B illustrate cross-hatching for identifying two types of hexagonal pixels.

FIG. 11 illustrates a configuration of hexagonal pixels achievable with the present system embodiments.

FIGS. 13A through 13D illustrate cross-hatch identification for four types of pixels.

FIG. 14 illustrates a matrix pattern formed with the pixels of FIGS. 13A through 13D using the embodiment of FIG. 12.

DESCRIPTION OF THE PREFERRED EMBODIMENTS

Figure 1:
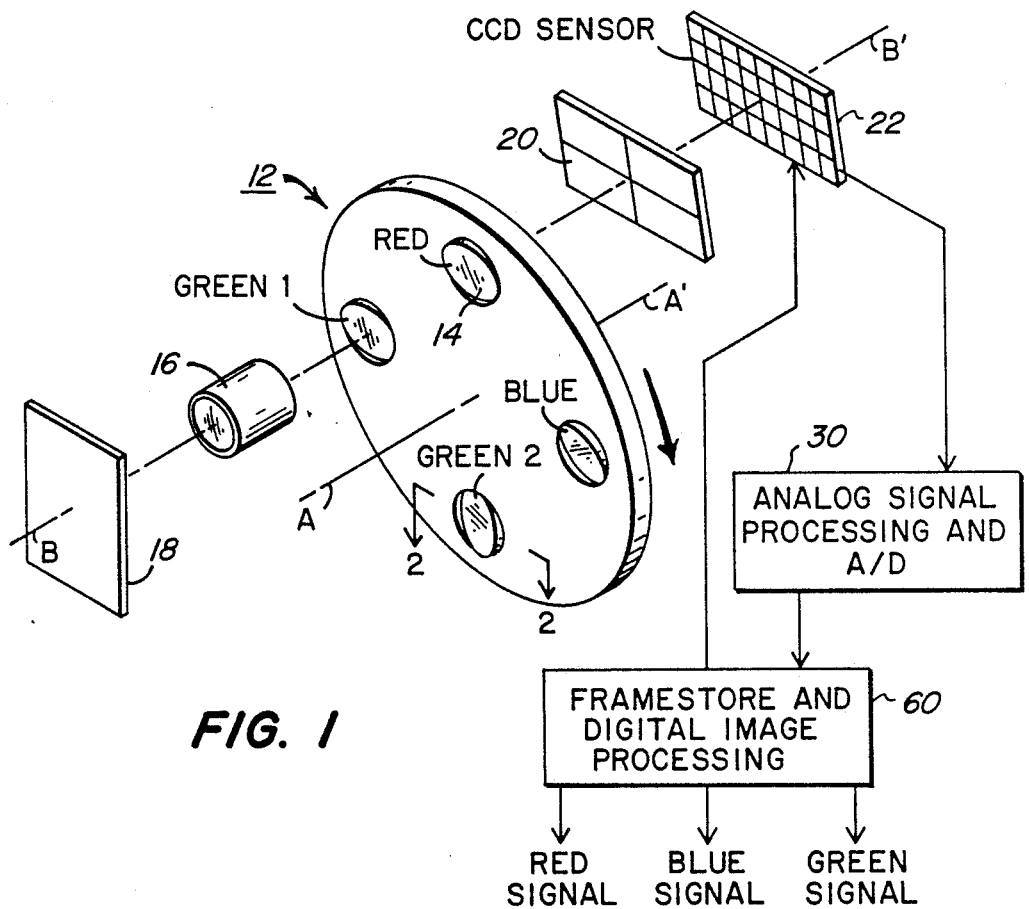
FIG. 1 is a perspective view of one preferred embodiment of the invention.

Referring to FIG. 1 a color wheel 12 is provided with a plurality of filters 14 which are further identified as being RED, GREEN 1, GREEN 2, and BLUE. The color wheel 12 is rotatable about the axis denoted A—A' by a motive means not shown. An image from an image plane 18 is directed through an optical lens system 16 along an optical axis B—B'. The axis A—A' of the color wheel 12 is positioned parallel to the optical axis B—B' at a distance which permits the color filters 14 to intersect the optical axis when the wheel 12 is rotated. A filter 20 is optionally interposed in the optical axis B—B' to intercept the image passing through the filters. The filter 20 is a color selective blur filter. Positioned along the optic axis B—B' behind the blur filter 20 is a monochrome CCD sensor 22. The sensor 22 incorporates an array of imaging cells spaced apart by a horizontal distance D. (See, for example, FIG. 3A Pixel Spacing.) Each sensor element (pixel) provides an electrical output indicative of the intensity of the light imaged on its surface. The electrical output signals from the CCD sensor 22 are directed as inputs to an analog signal processing and analog to digital (A/D) converter block 30. Within block 30 the signals from the sensor 22 are amplified, sampled, and converted to digital signals. The digital signals from the A/D converter portion of the block 30 are directed to a frame store and digital image processing block 60 which outputs a RED, a BLUE and a GREEN signal on three separate channels. These signals may then be used to recreate the image on a color viewing screen or on a hard copy print. Although the filter wheel 12 is shown positioned between the lens 16 and sensor 22, it is possible to instead position the filter wheel 12 between the image plane 18 and the lens 16.

Figure 2:
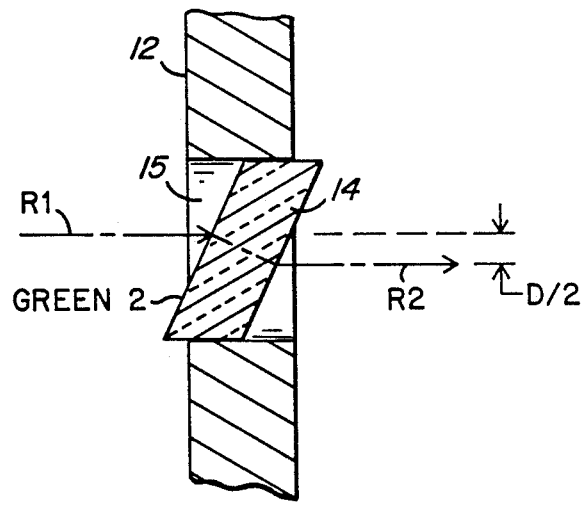
FIG. 2 is a sectioned view taken along the section lines 2—2 of FIG. 1.

Referring now to FIG. 2, the color wheel 12 has a defined openings 15 within which there are positioned color selective filters 14 which, for this view, is the GREEN 2 filter. Although the filter is shown within the opening, it is possible to instead mount it adjacent to the opening. The parallel optical surfaces of the filter are positioned at an angle so as to cause an incident ray R1 to be displaced a horizontal distance D/2, equal to half of the horizontal pixel pitch, relative to the image or rays passing through the GREEN 1 filter. The red and blue filters are each angled to translate the image on the CCD center horizontally by a distance equal to one-quarter of the horizontal pixel pitch relative to the image of the GREEN 1 filter. The red and blue rays passing through the filters may be blurred horizontally by the optional color selective blur filter 20. The pixels (electrical signals) of the two spaced-apart green images can be combined by alternating pixels from the first and the second green images to provide an improved resolution video image. A doubling of the green resolution will effectively double the luminance resolution.

To create these signals the color wheel 12, for example, is rotated to place the RED filter in the image beam. The CCD sensor 22 would first capture the red image and store it in the framestore 60. Next the filter wheel 12 would advance to place the GREEN 1 filter in the imaging path, and the green image record would be stored. The filter wheel 12 would advance to place the GREEN 2 filter in the imaging path, and the second green image, which is optically offset from the first green image, would be stored. Finally, the filter wheel 12 would turn again, and the blue image would be captured and stored. The digitally stored image can optionally be processed to improve the color and sharpness of the image using known enhancement and/or sharpening methods. The processed red, green and blue RGB image can be converted to analog form for TV display or for connection with other components of a video system.

The correct angle $\phi$ between the Green 1 and Green 2 glass plate 14 can be calculated from the formula:

$$\frac{D}{2} = T \sin \phi \left( 1 - \sqrt{\frac{\cos \phi}{N^2 - \sin^2 \phi}} \right)$$

if the CCD pixel pitch D, the index of refraction of the glass N, and the thickness of the glass T, are known. For example, if the horizontal pixel pitch of the CCD sensor is 15.6 microns, the distance D/2 is equal to 7.8 microns. Using glass with an index of refraction equal to 1.5 and a thickness of 1.0 millimeters, the angle $\phi$ equals 0.234 radians. If a glass plate 50 mm long is used, one horizontal end must be held approximately 1.17 mm further from the imager plane 18 of the sensor than the other. If, for example, the horizontal width of the photoactive area of the pixels equals 6.4 microns, combining the pixels from the displaced and non displaced images effectively provides 1140 horizontal pixels spaced 7.8 microns apart, with a 1.2 micron spacing between the pixel photoactive areas.

Because the filters are all the same thickness, only the relative angles of the four glass filters must be maintained in proper alignment to achieve correct optical offset sampling. Any shifting of the filter wheel from the optical axis causes the images from all filters to be shifted by the same amount so that the correct optical offset sampling is maintained.

Figure 3:
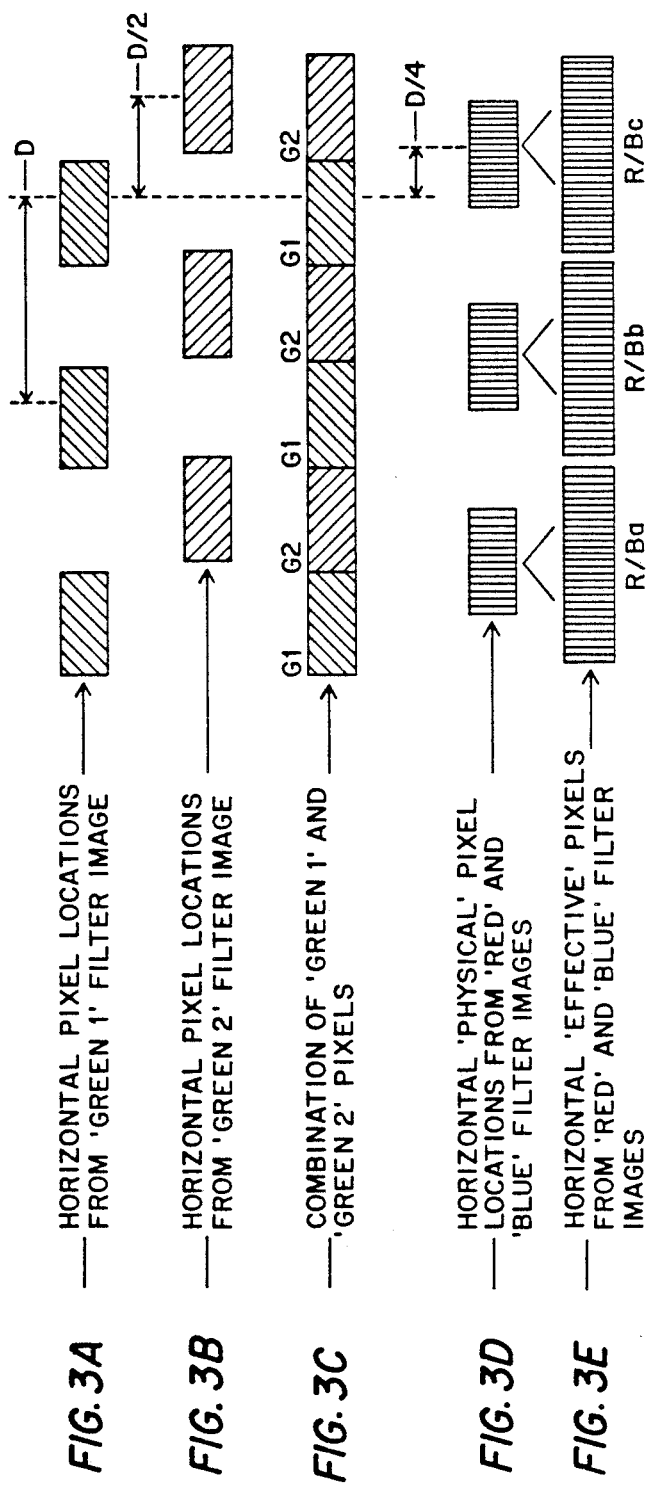
FIGS. 3A through 3E illustrate various pixel combinations achievable with the embodiment of FIG. 1.

Referring now to FIG. 3A which represents the horizontal pixel locations from the GREEN 1 filter image which are detected by the photoactive elements of the monochrome CCD sensor 22. The pixels are illustrated spaced apart in the horizontal dimension by the distance D. Referring to FIG. 3B, the image focused on the horizontal photoactive elements from the GREEN 2 filter, are shown optically displaced relative to the image plane 18 of FIG. 1, from the Photoactive elements of FIG. 3A by a distance of D/2. FIG. 3C illustrates the results of combining the GREEN 1 photoactive elements and the GREEN 2 photoactive elements on a horizontal axis which form a continual presence of green photoactive elements along the horizontal axis with twice as many pixels per row as the image sensor.

Referring now to FIG. 3D the horizontal pixel locations from the RED and BLUE filter images are shown displaced from the nominal distance by a horizontal distance equal to D/4. The red and blue pixels are optionally blurred through the filter 20 which results in the "effective" pixel pattern illustrated in FIG. 3E. The red and blue "effective" pixels are twice as large as the green pixels.

Figure 4:
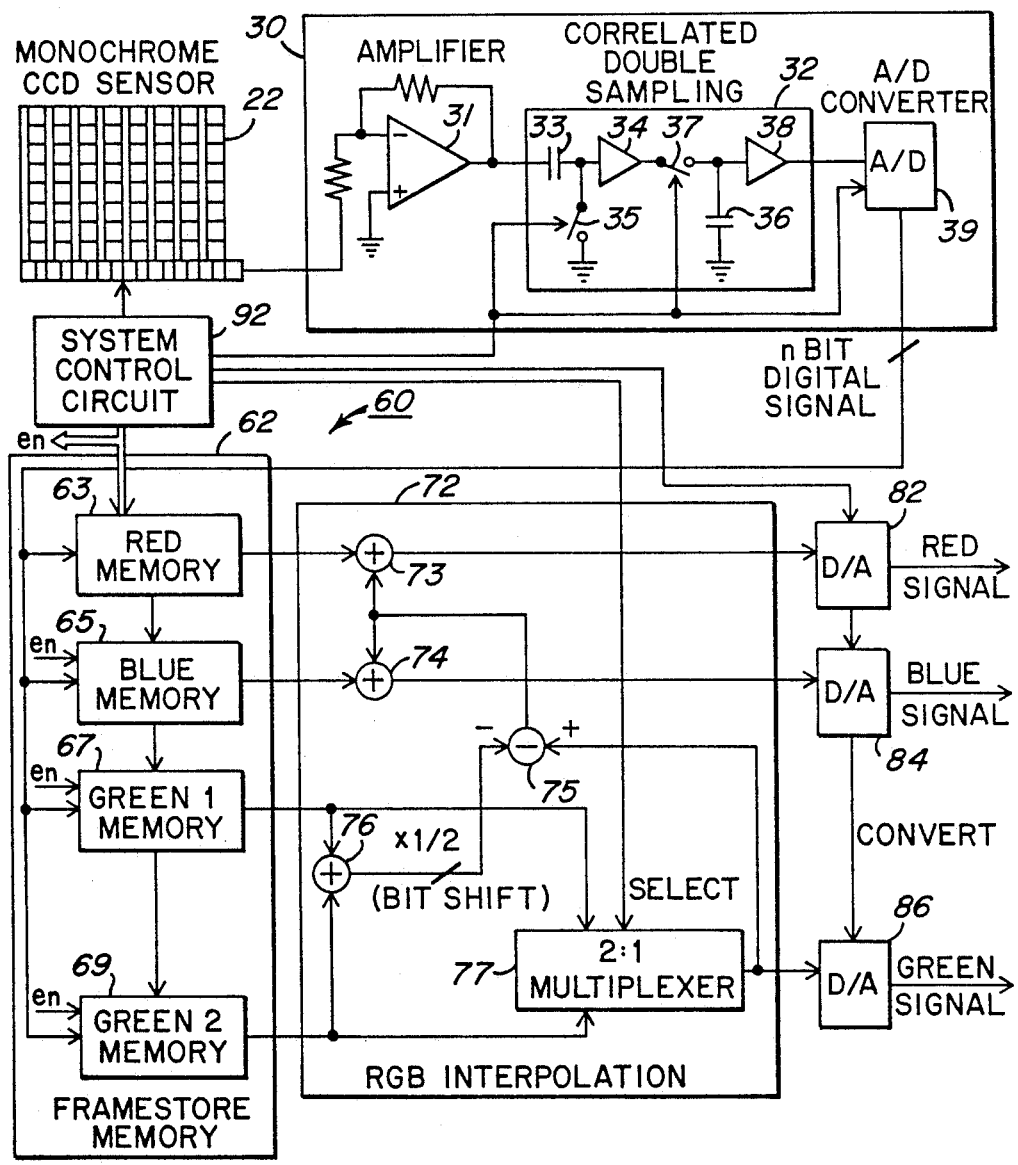
FIG. 4 is a block diagram of the electronics portion of the FIG. 1 embodiment.

Referring to FIG. 4 the output from the monochrome CCD sensor 22 is serial in format and is directed to the input of the analog signal processing and A/D circuit block 30 and more specifically to the input of an amplifier 31 which provides a degree of amplification and directs the amplified signal to a correlated double sampling circuit 32. Within the correlated double sampling circuit the output from amplifier 31 is directed through a capacitor 33 to decouple all DC components and from there to the input of an amplifier 34. The input to amplifier 34 is also connected, via switch 35 to a ground potential. The output of amplifier 34 is directed, via a switch 37, to the input of an amplifier 38 and a capacitor 36 which acts as an integrator connected to ground. With switch 35 open the voltage on capacitor 33 is amplified by amplifier 34 and passed through switch 37, when closed, to charge capacitor 36 and to appear on the input of an amplifier 38. Switches 35 and 36 operate from a signal appearing at the output of a system controller circuit 92. The analog signal appearing at the output of amplifier 38 is directed to an A/D converter 39 which converts the analog signal into an N bit digital signal that is directed to a frame store memory 62 and more specifically to the inputs of RED, BLUE, GREEN 1 and GREEN 2 memory banks, 63, 65, 67 and 69, respectively. Enable signals, from the system control circuit 92, selectively provide the activation for each of the respective memory banks in the framestore. The output signals from each of the memories of the frame store memory are directed to a RGB interpolation circuit 72. In one preferred embodiment, the output signal from the GREEN 1 memory 67 is directed to one input of a 2:1 multiplexer 77 which operates under control of a Select signal generated by the system control circuit 92. The second input to the multiplexer 77 is the output signal from the GREEN 2 memory 69. The multiplexer 77 toggles between the output of the GREEN 1 memory and GREEN 2 memory to provide a signal to the input of a D/A converter 86 the output of which is a GREEN signal. Additionally, the output of the multiplexer 77 is connected as a plus input to a subtraction circuit 75, which also receives as a minus input the sum of the signals appearing at the output of the GREEN 1 and GREEN 2 memories summed by a summer 76 and then bit shifted by one bit. The difference between these two signals appears at the output of the subtraction circuit 75, which is connected to the inputs of a pair of adder circuits 73 and 74 such that the difference is added to signals from the output of the RED memory 63 and the BLUE memory 65. The output signals from the adders 73 and 74 are directed to D/A converters 82 and 84, respectively, to provide the RED signal and BLUE signal, respectively.

Figure 5:
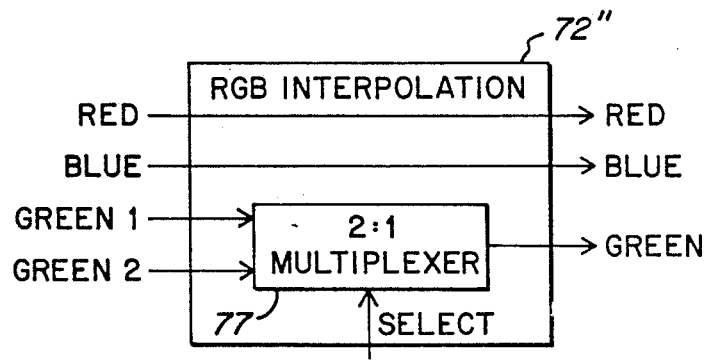
FIG. 5 is a block diagram of an alternate configuration for a segment of the block diagram of FIG. 4.

An alternate embodiment for the RGB interpolation circuit 72 is shown in FIG. 5 as block 72″, wherein the 2:1 multiplexer 77 receives the outputs of the GREEN 1 memory 67 and GREEN 1 memory 69 directly and multiplexes these signals to its output as the GREEN signal under control of the Select signal. The output from the RED memory 63 and the BLUE memory 65 are passed through the interpolation circuit and appear as the RED signal and the BLUE signal.

Use of the optional prefilter 20 along with the RGB interpolation circuit 72 eliminates the colored fringes which otherwise might occur at abrupt horizontal luminance edges in the image. The combination of the prefiltering, green optical offset sampling, and RGB interpolation makes the RGB signal outputs equal for monochrome areas of the image. Utilization of the RGB interpolation circuit of FIG. 5 in the FIG. 4 embodiment will cause some slight coloration to occur at the sharp horizontal edges, although the horizontal luminance resolution will still be double that of a system using only a single green filter.

Referring back to FIG. 2, and specifically to the tilting of the filter 14; as will be remembered the tilting shown in FIG. 2 causes the image formed on the CCD sensor 22 to be displayed in a horizontal direction. By maintaining the same angle of the filter 14 but rotating the filter 90 degrees from the position shown in FIG. 2, a vertical displacement can be obtained for the image on the surface of the sensor. In a like manner, if the filter is rotated only 45 degrees from the position shown, then the image will move both in a horizontal and in a vertical direction. The angle of the filter used to provide the proper vertical or diagonal displacement, depends on the vertical or diagonal distance between pixels on the sensor, which may not be equal to the horizontal distance between the pixels.

The color selective blur filter 20 may be designed using the method disclosed in U.S. Pat. No. 4,605,956, entitled "Single Chip Electronic Color Camera with Color Dependent Birefringent Optical Spatial Frequency Filter and Red and Blue Interpolating Circuit" by David R. Cok which patent is also assigned to Eastman Kodak Company, the assignee of the present invention. The filter splits the red and blue light into two images which are horizontally displaced by a distance D/2 equal to half the sensor horizontal pixel pitch, while green remains a single image. The red and blue color filters are angled to offset the image by ¼ of the horizontal pixel pitch which provides the physical pixels of FIG. 3D and the "effective" pixels of FIG. 3E. The use of the color selective blur filter 20 provides perfect spatial coincidence between the red and the blue pixels and the sum of two horizontally adjacent green pixels.

Figure 6A:
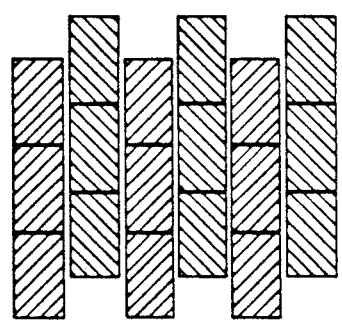
FIGS. 6A through 6C illustrate additional pixel configurations achievable with the embodiment of FIG. 1.
Figure 6C:
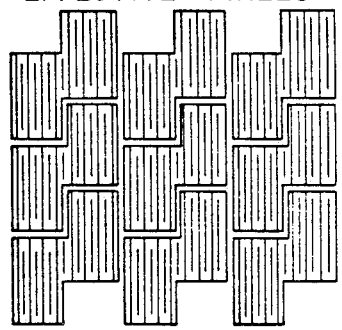
Figure 6B:
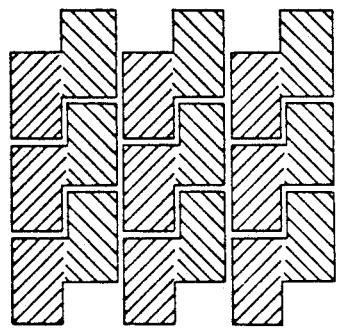

With the GREEN 2 filter tilted to displace the image both vertically and horizontally, the diagonal optical offset pattern illustrated in FIG. 6A is achieved. FIG. 6C illustrates the pattern of the red and the blue "effective" pixels when a diagonally oriented red and blue color selective blur filter is used. FIG. 6B illustrates the summing operation for two green pixels. The sum of 2 green pixels provides perfect color coincidence which prevents colored fringing.

Figure 7:
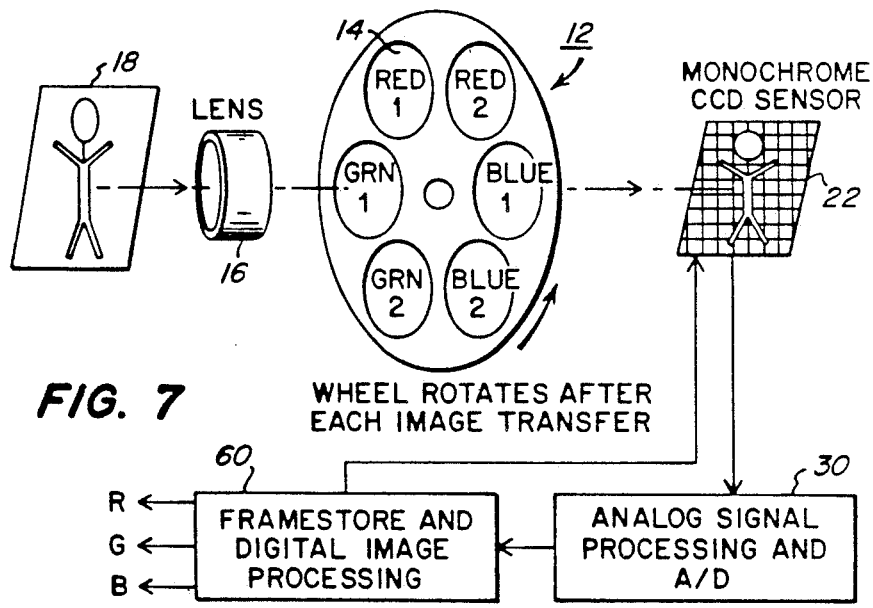
FIG. 7 illustrates in schematic diagram form a second embodiment of the present invention.

FIG. 7, illustrates a second type of system wherein the image from a print, slide or still scene 18 is focused by the lens system 16 onto the monochrome CCD sensor 22. The filter wheel 12 is provided with six filters 14; a RED 1 and 2, BLUE 1 and 2, and a GREEN 1 and 2. The analog signal processing and A/D circuit 30 receives the signals generated by the CCD sensor 22 and directs the N bit digitally processed equivalent signals to the framestore and digital image processing circuit 60 to provide at the output the RED, GREEN, and BLUE signals which are used to form a color image. FIGS. 8 through 11 illustrate the patterns of pixels that are achieved with the system embodiment of FIG. 7.

Referring now to FIG. 8, wherein the locations of the RED 1, BLUE 1, and GREEN 1 filter pixels are identified by the cross hatching shown in A and the RED 2, GREEN 2 and BLUE 2 filter pixels are identified by the cross hatchings shown in B. FIG. 9A illustrates the horizontal displacement and recombination of the pixel elements of three lines of the pixels of FIGS. 8A and 8B. FIG. 9B illustrates the output for a vertical displacement and recombination, and FIG. 9C illustrates the output for a diagonal displacement and recombination.

Referring to FIG. 10, with the pixels formed in a hexagonal shape the RED, GREEN and BLUE filter 1 pixels shown in A and the RED, GREEN and BLUE filter 2 pixels shown in B when combined in a diagonal format will form the pattern shown in FIG. 11.

Figure 12:
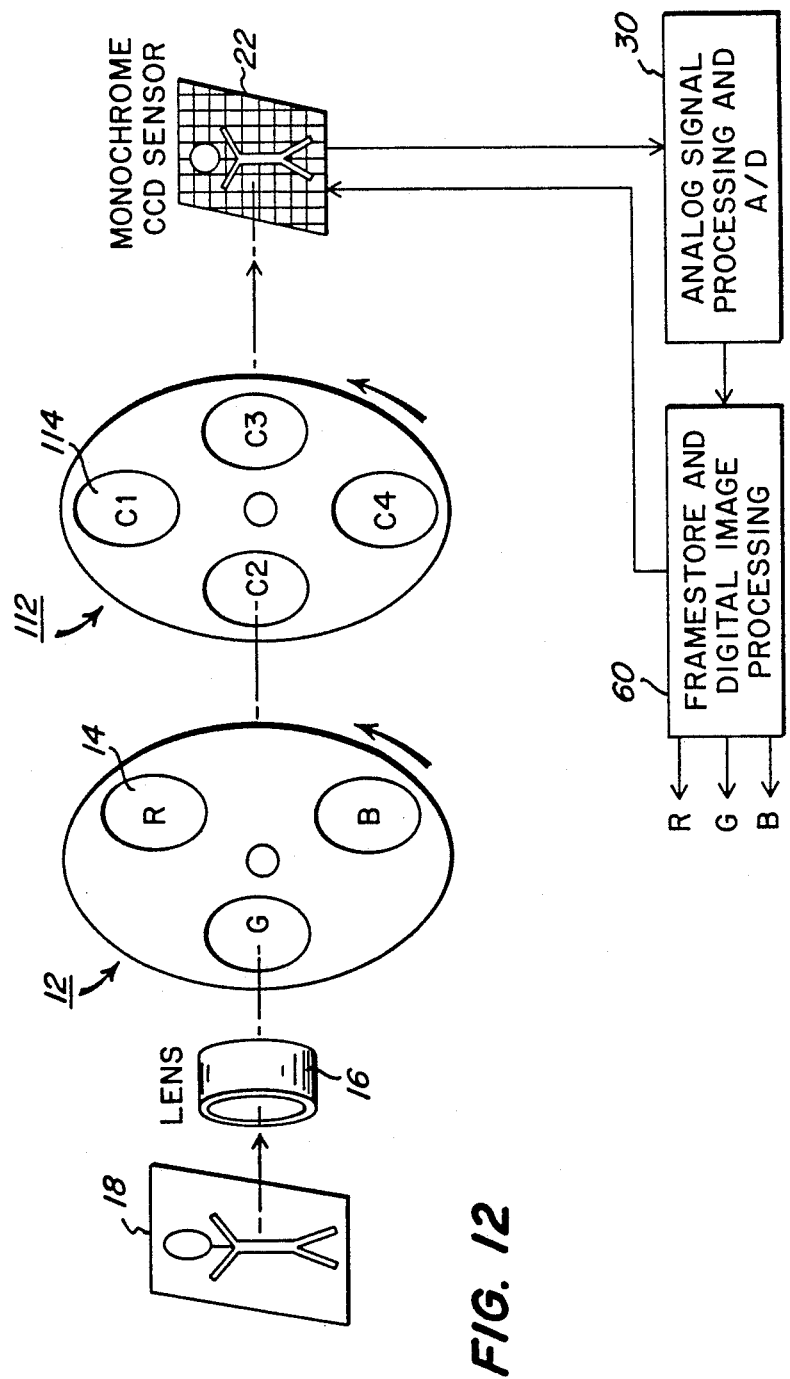
FIG. 12 illustrates in block schematic form a third embodiment of the present invention.

FIG. 12 illustrates a third type of system wherein the image from a print, slide, or still scene 18 is focused by the lens system 16 onto the monochrome CCD sensor 22. The color filter wheel 12 is provided with three filters 14, one each for RED, GREEN, and BLUE. A second filter wheel 112 includes four, clear glass plates 114, $C_1$-$C_4$, three of which are angled to provide horizontal, vertical, and diagonal optical offset sampling. In operation one color filter 14 is rotated into position with one glass plate 114 and the signals generated by the CCD sensor 22 stored. The filter wheel 112 is rotated to place the next glass plate into position and the signals generated by the CCD sensor 22 are stored. This process continues for all plates of filter wheel 112 before filter wheel 12 is rotated to the next position. The analog signal processing and A/D circuit 30 receives the signals generated by the CCD sensor 22 and directs the N bit digitally processed equivalent signals to the framestore and digital image processing circuit 60 to provide at the output the RED, GREEN, and BLUE signals which are used to form a color image.

FIG. 13 illustrates the pixel cross hatching indicating the red, green and blue pixels from the four optical filters in filter wheels 12 and 114. Combining the color images from the systems of FIG. 13 produces the mosaic pattern illustrated in FIG. 14.

While there has been disclosed what is considered to be the preferred embodiments of the present invention, it will be manifest that many changes and modifications may be made therein without departing from the essential spirit of the invention. It is intended, therefore, in the annexed claims to cover all such changes and modifications as may fall within the true spirit of the invention.

We claim:

1. An optical offset image sampling system comprising:
   means for creating an image beam;
   a rotating filter wheel intersecting said image beam and incorporating at least two angled glass plates of like, composition, color, and thickness at least one of which displaces the image by a distance equal to a fraction of the distance D between photosensitive elements;
   an array of photosensitive elements positioned to receive the image beam which passes through each filter with each of said photosensitive elements capable of producing electrical signals indicative of the intensity of light incident thereon and each element having its center positioned a distance D from adjacent elements;
   means for storing the electrical signals from each photosensitive element of said array for each separate glass plate; and
   means for combining the stored electrical signals associated with each glass plate to form a higher resolution image.

2. The system of claim 1 wherein said combining means interleaves the stored electrical signals produced in association with the color image passing through at least two glass plates of the same color with the electrical signals produced in association with the remaining glass plates.

3. The system of claim 1 wherein said angled glass plates are: one red, one blue, and two green plates, the second green plate providing an image that is displaced horizontally, vertically, or diagonally be one-half the horizontal, vertical, or diagonal photosensitive element distance.

4. The system of claim 1 and further comprising:
   a color selective blur filter means for providing two images in red and blue separated by a distance equal to the distance between the images from the two green filters.

5. The system of claim 4 wherein said means for combining includes a summing circuit which sums at least two of the stored electrical signals to form "effectively" equal photosensitive areas.

6. The system of claim 1 and further comprising a blur filter positioned in the path of said color image beam.

7. The system of claim 1 wherein each of said photosensitive elements is hexagonally shaped.

8. An optical offset image sampling system comprising:
   means for creating a color image beam;
   a set of primary color filters;
   first means for sequentially placing each of said primary color filters into the color image beam;
   a plurality of image displacing elements of similar composition, at least one of which displaces the image by a distance equal to a fraction of the distance D between photosensitive elements;
   second means for sequentially placing each image displacing element into the color image beam;
   an array of photosensitive elements positioned to receive the color image beam which passes through a primary color filter and at least one of said image displacing elements, with each of said photosensitive elements capable of producing electrical signals indicative of the intensity of light incident thereon and each photosensitive element having its center displaced a distance D from adjacent elements;
   means for storing the electrical signals from each photosensitive element of said array for each separate filter; and
   means for combining the stored electrical signals associated with each filter to form a composite color image.

9. The system of claim 8 wherein each of said image displacing elements displaces the image in a different direction.

10. The system of claim 8 wherein each of said image displacing elements is an angled glass plate.

11. The system of claim 8 wherein each of said photosensitive elements is hexagonally shaped.

* * * * *